United States Patent
Usui

(10) Patent No.: US 10,958,544 B2
(45) Date of Patent: Mar. 23, 2021

(54) COMMUNICATION DEVICE, COMMUNICATION SYSTEM, COMMUNICATION METHOD, AND PROGRAM

(71) Applicant: Yamaha Corporation, Hamamatsu (JP)

(72) Inventor: Atsushi Usui, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 14 days.

(21) Appl. No.: 15/933,009

(22) Filed: Mar. 22, 2018

(65) Prior Publication Data

US 2018/0219750 A1 Aug. 2, 2018

Related U.S. Application Data

(63) Continuation of application No. PCT/JP2016/076839, filed on Sep. 12, 2016.

(30) Foreign Application Priority Data

Sep. 24, 2015 (JP) .............................. JP2015-186359

(51) Int. Cl.
*H04L 12/26* (2006.01)
*G06F 13/00* (2006.01)
(Continued)

(52) U.S. Cl.
CPC .............. *H04L 43/04* (2013.01); *G06F 13/00* (2013.01); *H04L 41/069* (2013.01);
(Continued)

(58) Field of Classification Search
CPC . H04L 43/04; H04L 67/1097; H04L 43/0888; H04L 41/069; H04L 12/46; G06F 13/00
See application file for complete search history.

(56) References Cited

U.S. PATENT DOCUMENTS

2003/0145082 A1* 7/2003 Son .................... H04L 29/12009
709/224
2003/0161295 A1* 8/2003 Shah ................. H04L 29/06027
370/352

(Continued)

FOREIGN PATENT DOCUMENTS

JP  2003-198746 A  7/2003
JP  2004-357226 A  12/2004
(Continued)

OTHER PUBLICATIONS

Extended European Search Report issued in counterpart European Application No. 16848531.6 dated Feb. 27, 2019 (eight pages).

(Continued)

*Primary Examiner* — Hashim S Bhatti
(74) *Attorney, Agent, or Firm* — Crowell & Moring LLP

(57) ABSTRACT

A communication device includes: a first processing circuit including an acquisition unit that acquires first information via a first network from a first device connected to the first network, the first information being related to the first device; and a storage that stores device information including the acquired first information, the device information being readable from the storage via a second network by a second device connected to the second network, the second network being a network external to the first network.

15 Claims, 3 Drawing Sheets

(51) Int. Cl.
*H04L 12/24* (2006.01)
*H04L 29/08* (2006.01)
*H04L 12/46* (2006.01)

(52) U.S. Cl.
CPC ...... *H04L 43/0888* (2013.01); *H04L 67/1097* (2013.01); *H04L 12/46* (2013.01)

(56) References Cited

U.S. PATENT DOCUMENTS

| | | | |
|---|---|---|---|
| 2003/0212787 A1* | 11/2003 | Qiu | H04L 47/10 709/224 |
| 2004/0019691 A1 | 1/2004 | Daymond et al. | |
| 2006/0218264 A1 | 9/2006 | Ogawa et al. | |
| 2007/0237158 A1* | 10/2007 | Leef | H04L 12/4641 370/395.53 |
| 2008/0126740 A1* | 5/2008 | Wrighton | G06F 9/45516 711/208 |
| 2008/0228904 A1 | 9/2008 | Crespo-Dubie et al. | |
| 2009/0100492 A1 | 4/2009 | Hicks, III et al. | |
| 2010/0054266 A1 | 3/2010 | Bouchat et al. | |
| 2010/0217888 A1 | 8/2010 | Ukita et al. | |
| 2012/0151549 A1 | 6/2012 | Kumar et al. | |
| 2012/0159575 A1* | 6/2012 | Fukui | H04L 9/0844 726/3 |
| 2012/0324567 A1 | 12/2012 | Couto et al. | |
| 2013/0312021 A1 | 11/2013 | Cassanova | |
| 2014/0304452 A1* | 10/2014 | de la Iglesia | G06F 12/0246 711/103 |
| 2014/0370968 A1* | 12/2014 | Curtis | G06Q 30/0207 463/25 |
| 2015/0089557 A1* | 3/2015 | Busse | H04N 21/23439 725/95 |
| 2015/0146564 A1* | 5/2015 | Wu | H04L 12/2809 370/252 |
| 2015/0237102 A1* | 8/2015 | Baccichet | H04L 65/605 709/204 |
| 2015/0287390 A1* | 10/2015 | Kakeko | H04L 67/10 345/1.1 |
| 2017/0325151 A1* | 11/2017 | Fujishiro | H04W 28/08 |

FOREIGN PATENT DOCUMENTS

| | | |
|---|---|---|
| JP | 2005-26856 A | 1/2005 |
| JP | 2006-279283 A | 10/2006 |
| JP | 2010-068075 A | 3/2010 |
| JP | 2012-501562 A | 1/2012 |
| JP | 2013-34117 A | 2/2013 |
| JP | 2015-527786 A | 9/2015 |
| WO | WO 2010/007749 A1 | 1/2010 |
| WO | WO 2014/005852 A1 | 1/2014 |

OTHER PUBLICATIONS

Japanese-language Office Action issued in counterpart Japanese Application No. 2015-186359 dated Jun. 4, 2019 with English translation (seven (7) pages).
Sato, "Broadband Router Complete Capture", PC Japan, Softbank Creative Corp., Dec. 1, 2005, pp. 120-125, vol. 10, No. 12, Japan, (seven (7) pages).
Yoshizawa, "Router Setting Technique for Beginners, P2P is Realized Securely", DOS/V magazine, Softbank Publishing, May 1, 2003, pp. 80-83, vol. 12, No. 9, Japan, (five (5) pages).
International Search Report (PCT/ISA/210) issued in PCT Application No. PCT/JP2016/076839 dated Dec. 6, 2016 with English-language translation (five (5) pages).
Japanese-language Written Opinion (PCT/ISA/237) issued in PCT Application No. PCT/JP2016/076839 dated Dec. 6, 2016 (four (4) pages).
John Blackford et al., CPE WAN Management Protocol, Broadband Forum Technical Report, Nov. 2013, Issue 1 Amendment 5, pp. 1-73, The Broadband Forum.

* cited by examiner

COMMUNICATION DEVICE, COMMUNICATION SYSTEM, COMMUNICATION METHOD, AND PROGRAM

CROSS-REFERENCE TO RELATED APPLICATIONS

The present application is a continuation application of International Application No. PCT/2016/076839, filed Sep. 12, 2016, which claims priority to Japanese Patent Application No. 2015-186359, filed Sep. 24, 2015. The contents of these applications are incorporated herein by reference.

BACKGROUND OF THE INVENTION

The present invention relates to a communication device that connects a LAN (Local Area Network) and a WAN (Wide Area Network).

Description of Related Art

Conventionally, support work has been performed for users that use electronic devices. Japanese Unexamined Patent Application, First Publication No. 2005-26856 (hereinafter Patent Document 1) describes a remote access system that maintains and manages a user side computer device by a remote operation from a support center side operator terminal over a tunnel connection.

SUMMARY OF INVENTION

For example, there is an AV system configured by devices such as; a storage device storing audio data and video data, an AV amplifier, and a loudspeaker, that are connected to a LAN. If the user cannot play, for example, audio data using the AV system, the cause may be that the devices are not connected via the LAN. In order to confirm whether or not a device is connected to the LAN, for example, it is generally necessary for the user to operate an operation unit provided on the device, and confirm the connection of each of the devices, which is troublesome. If the user is unable to play audio data and the like, there are cases where a query is made to a support center. However, the operator of the support center is generally unable to directly access the user's LAN. Therefore, it is not possible to directly obtain information on whether or not the device is connected to the LAN. In particular, if the user is unskilled in setting a LAN, it takes time to confirm the LAN connection, which creates difficulty in providing support.

In the remote access system described in Patent Document 1, it is necessary for each of the devices to include a tunnel connection means. Furthermore, in order to confirm the connection of the devices, it is necessary to confirm by remote control, for all of the devices, whether or not they are connected to the LAN. Such processing is time-consuming and may also cause security problems.

The present invention has been proposed in view of the above problems. An example of an object of the present invention is to acquire information related to a device connected to a network, and provide the information thereof to a device connected to an external network.

A communication device according to an aspect of the present invention includes: a first processing circuit including an acquisition unit that acquires first information via a first network from a first device connected to the first network, the first information being related to the first device; and a storage that stores device information including the acquired first information, the device information being readable from the storage via a second network by a second device connected to the second network, the second network being a network external to the first network.

A communication system according to an aspect of the present invention includes a first device and a communication device. The first device is connected to a first network and transmits first information to the communication device via the first network, the first information being related to the first device. The communication device includes: a first processing circuit including an acquisition unit that acquires the transmitted first information via the first network from the first device; and a storage that stores device information comprising the acquired first information, the device information being readable from the storage via a second network by a second device connected to the second network, the second network being a network external to the first network.

A communication method according to an aspect of the present invention includes: acquiring first information via a first network from a first device connected to the first network, the first information being related to the first device; and storing, in a storage, device information comprising the acquired first information. The device information is readable from the storage via a second network by a second device connected to the second network, the second network being a network external to the first network.

A program according to an aspect of the present invention is for causing a computer to execute: acquiring first information via a first network from a first device connected to the first network, the first information being related to the first device; and storing, in a storage, device information comprising the acquired first information. The device information is readable from the storage via a second network by a second device connected to the second network, the second network being a network external to the first network.

It is possible to acquire information related to a device connected to a network, and provide the information thereof to a device connected to an external network.

EMBODIMENTS FOR CARRYING OUT THE INVENTION

Figure 1:
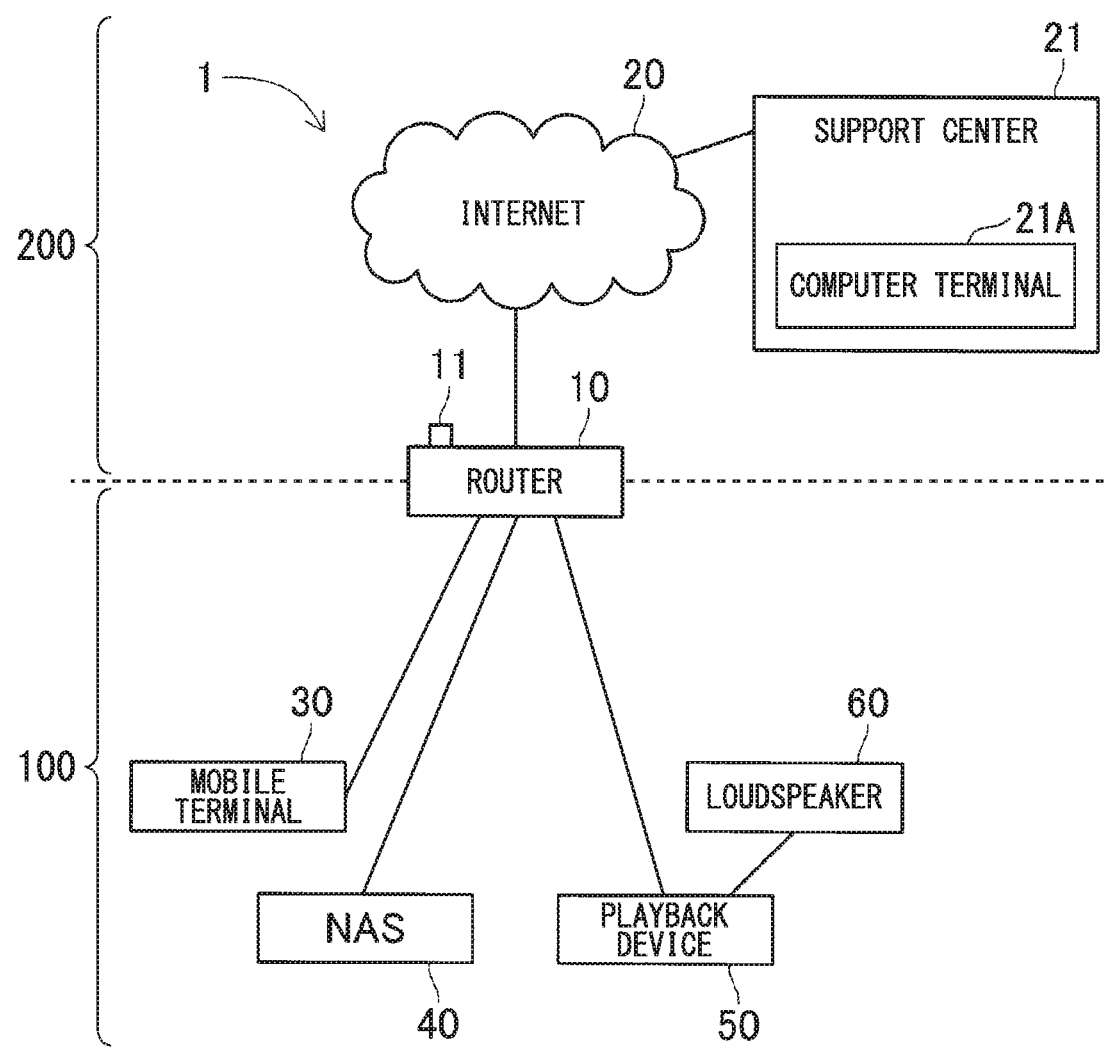
FIG. 1 is a diagram showing an overall configuration of a system according to an embodiment.

An overall configuration of a system 1 including a router (communication device) 10 according to an embodiment will be described with reference to FIG. 1. The system 1 includes a router 10, a mobile terminal 30, a NAS (Network Attached Storage) 40, a playback device 50, and a loudspeaker 60. The mobile terminal 30, the NAS 40, and the playback device 50 constitute a LAN 100 that uses a TCP/IP protocol via the router 10. Hereunder, the mobile terminal 30, the NAS 40, and the playback device 50 connected to the LAN 100 are collectively referred to as connected devices. The connected devices can connect to the Internet 20 via the router 10. The connected devices and the router 10 support a wireless LAN, and the connected devices and the router 10 can perform wireless communication with each other. FIG. 1 further shows a support center 21. The system 1 may further include the support center 21. An operator of the support center 21 (hereunder simply referred to as an operator) performs support on the system 1. A computer terminal (communication terminal) 21A of the support center 21 is connected to the Internet 20. The loudspeaker 60 is connected to the playback device 50 via a loudspeaker cable.

The router 10 connects the LAN 100 and the Internet 20. The Internet 20 is a WAN 200, which is a network external to the LAN 100. That is to say, the WAN 200 is a network different from the LAN 100. The router 10 functions as a wireless LAN access point. The router 10 has a NAT (Network Address Translation) function that converts global IP addresses and private IP addresses, a DHCP (Dynamic Host Configuration Protocol) server function that manages information necessary for network communication such as IP addresses, and the like. The router 10 includes a button 11. The button 11 is pressed by the user to instruct the execution of information acquisition processing as described below.

The NAS 40 includes a storage unit or the like having a predetermined storage capacity. Data such as audio data is stored in the storage unit. Furthermore, the NAS 40 has a communication function that transfers, in response to a data transfer request from another connected device, data stored in the storage unit to the connected device representing the request source for example.

The playback device 50 includes a communication function, a playback function, and the like. Specifically, the playback device 50 includes a DA converter unit (not shown in the figure) and an amplifier unit (not shown in the figure) in order to realize the playback function. The DA converter unit converts digital audio data to analog audio data. The amplifier unit amplifies the analog audio data and outputs it according to a set volume. Specific examples of audio data formats that can be played by the playback device 50 may include WAV, FLAC, AIFF, MP3, WMA, AAC, ALAC, and DSD. The playback device 50 is capable of playing audio data having sampling frequencies of various formats. For example, when the audio data format is the WAV, FLAC, or AIFF format, specific examples of playable sampling frequencies are 44.1 kHz to 192 kHz and 16 bit to 24 bit. The loudspeaker 60 emits sound according to the analog audio data transmitted from the playback device 50.

The mobile terminal 30 represents a mobile phone, a smartphone, or a tablet terminal for example. In the mobile terminal 30, application software that controls the NAS 40 and the playback device 50 via the LAN 100 is installed beforehand. The mobile terminal 30 functions as a controller that accepts an instruction from the user, and controls the NAS 40 and the playback device 50 according to the instruction thereof.

The application software installed on the mobile terminal 30 for controlling the playback device 50, and the playback device 50, support information acquisition processing. The NAS 40 does not support information acquisition processing. Here, information acquisition processing represents processing in which the router 10 acquires information related to the connected devices, creates device information 71 (refer to FIG. 4), and stores it in a WAN-side storage unit (second storage unit) 140. The device information 71 is information in which information related to each connected device is aggregated. Specific examples of information related to each connected device include information such as; product identifying information, an installed function, an IP address, log information (including error log information), a measured throughput, and a calculated bit rate. The product identifying information represents a product name, a model name, or a model number for example.

In the system 1, the connected devices can communicate with each other via a wireless LAN. Further, each connected device can communicate according to the DLNA (registered trademark) (Digital Living Network Alliance) and Bonjour guidelines. The playback device 50 is permitted to access the NAS 40. The playback device 50 transfers the audio data stored in the NAS 40. The playback device 50 performs so-called streaming playback, in which the audio data is played while being received.

Figure 2:
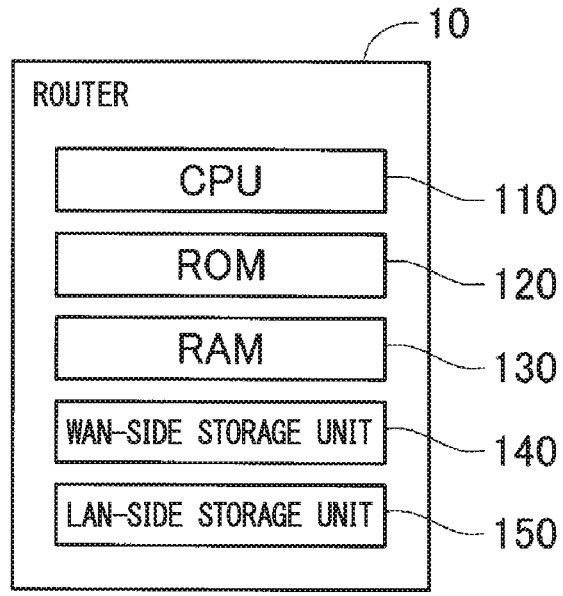
FIG. 2 is a block diagram showing a configuration of a router according to an embodiment.

Next, the configuration of the router 10 will be described with reference to FIG. 2. The router 10 includes a CPU 110, a ROM 120, a RAM 130, a WAN-side storage unit 140, a LAN-side storage unit (first storage unit) 150, and the like. The CPU 110 controls each part of the router 10 by executing various programs stored in the ROM 120, including information acquisition processing as described below. The RAM 130 is used as a main storage device for the CPU 110 to execute various processing. The WAN-side storage unit 140 is a storage unit configured such that it can be read, and be written to, by a device (device on the LAN 100 side) connected to the LAN 100. It is also configured such that it is can be read by a device (device on the WAN 200 side) connected to the WAN 200. For example, the WAN-side storage unit 140 may permit access by a device connected to the LAN 100, and may also permit access by a device connected to the WAN 200. The device information 71 (FIG. 4) is stored in the WAN-side storage unit 140. The LAN-side storage unit 150 is a storage unit configured such that it can be read, and be written to, by a device connected to the LAN 100. It is also configured such that it cannot be read by a device connected to the WAN 200. For example, the LAN-side storage unit 150 may permit access by a device connected to the LAN 100, and may also deny access by a device connected to the WAN 200. The LAN-side storage unit 150 stores a correspondence table between the MAC addresses of the connected devices and the IP addresses assigned to the connected devices. The WAN-side storage unit 140 and the LAN-side storage unit 150 may be provided in the RAM 130.

The application software that controls the playback device 50 is installed on the mobile terminal 30. The user plays the audio data stored in the NAS 40 by using the application software of the portable terminal 30. For example, the user activates the application software that controls the playback device 50, and sets the NAS 40 as the input device to the playback device 50. Then, the user selects the audio data that they wish to listen to from the audio data stored in the NAS 40, which is displayed in a list format. The playback device 50 transfers the selected audio data to the NAS 40 according to the command transmitted from the portable terminal 30. The playback device 50 performs streaming playback based on the data thereof.

Figure 3:
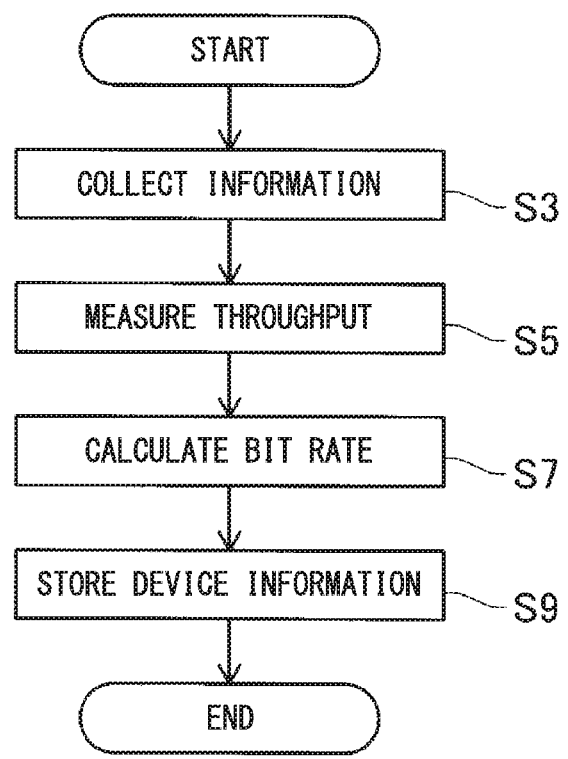
FIG. 3 is a flowchart showing the processing contents of information acquisition processing according to an embodiment.

Next, information acquisition processing executed by the router 10 will be described with reference to FIG. 3. Here, a case where the user queries the support center 21 due to a malfunction, such as an interruption in playback audio occurring after performing the operation described above for listening to the audio data, is described as an example. The device information 71 of the system 1 used by the user is useful for investigating the cause of the malfunction. Therefore, for example, the operator instructs the user to press the button 11 provided on the router 10 in order to cause the router 10 to execute information acquisition processing.

When the user presses the button 11, the CPU 110 detects that the button 11 has been pressed, and starts information acquisition processing. First, the CPU 110 collects individual device information from the connected devices by communicating with each of the connected devices (step S3). The CPU 110 transmits to each of the connected devices, an instruction that requests transmission of the individual device information. The individual device information is information related to the individual connected devices. For example, the individual device information of the mobile terminal 30 is related to the mobile terminal 30.

The application software installed on the mobile terminal 30 for controlling the playback device 50, and the playback device 50 support information acquisition processing. Consequently, the mobile terminal 30 and the playback device 50 transmit individual device information (individual connection information) having preset contents according to the instruction. The individual device information transmitted by the mobile terminal 30 and the playback device 50 includes information such as; an IP address and product identifying information, for example, a model name or product name or model number, an installed function, log information, and the like. The individual device information of the portable terminal 30 includes, as exemplified in FIG. 4, a model name "A", an IP address, the name of the OS (Operating System) installed as an installed function, and the like. The individual device information of the playback device 50 includes, as exemplified in FIG. 4, a model name "C", an IP address, log information (information including an error log), the supported sound format as an installed function, the sampling frequency, and the like. The log information includes, for example, the date and time the individual device was activated, the date and time in which processing by the individual device ended with an error, and information indicating the content of the error in the processing by the individual device. The information indicating the content of the error in the processing by the individual device may be an error number for example. The CPU 110 stores the respective individual device information of the mobile terminal 30 and the playback device 50 received from the mobile terminal 30 and the playback device 50, in the RAM 130.

The NAS 40 does not support information acquisition processing. Consequently, the NAS 40 does not transmit individual device information even if it receives a command requesting the transmission of individual device information. After a predetermined time has elapsed following transmission of the command, the CPU 110 refers to the correspondence table stored in the LAN-side storage unit 150 for example. The CPU 110, based on the correspondence table thereof, extracts the NAS 40 from among the connected devices assigned with an IP address, which represents the connected device that has not transmitted individual device information. Then, the CPU 110 transmits a command to the NAS 40 requesting transmission of information that can be queried according to DLNA guidelines. The information that can be queried according to DLNA guidelines represents, for example, information such as a product category, an IP address, space available, and the like. In response to the command, the NAS 40 transmits the individual device information. The individual device information of the NAS 40 includes, as exemplified in FIG. 4, the product category "B", the IP address, the value of the space available in the storage unit, and the like. The CPU 110 stores the individual device information of the NAS 40 received from the NAS 40, in the RAM 130. If a connected device (NAS 40) that does not support information acquisition processing is to be queried, it is in no way limited to requesting transmission of information according to the DLNA guidelines described above. The CPU 110 may request transmission of information according to another general protocol such as Bonjour.

Next, the CPU 110 measures a throughput of the data transfer between the router 10 and the connected devices (step S5). For example, the CPU 110 measures the throughput using a command that can be supported by both the router 10 and the connected device. Specifically, the router 10 transmits test data of a predetermined data size to the connected device according to a command. When the connected device receives the test data according to the command, it returns the test data to the router 10 as is. The CPU 110 measures the time from the transmission of the test data to its reception, calculates the throughput from the measured time and the data size of the test data, and stores the throughput thereof in the RAM 130. Then, the CPU 110 calculates a bit rate of the audio data that can be played by the system 1 using the measured throughputs. For example, the bit rate is calculated based on the lowest value among the measured throughputs related to the router 10 and each of the plurality of connected devices, and is stored in the RAM 130. For example, the CPU 110 measures the throughput between the router 10 and the mobile terminal 30, the throughput between the router 10 and the NAS 40, and the throughput between the router 10 and the playback device 50. In this case, the CPU 110 identifies the lowest throughput among the measured throughputs, and calculates the bit rate of the audio data that can be played by the system 1 using the identified throughput.

Figure 4:
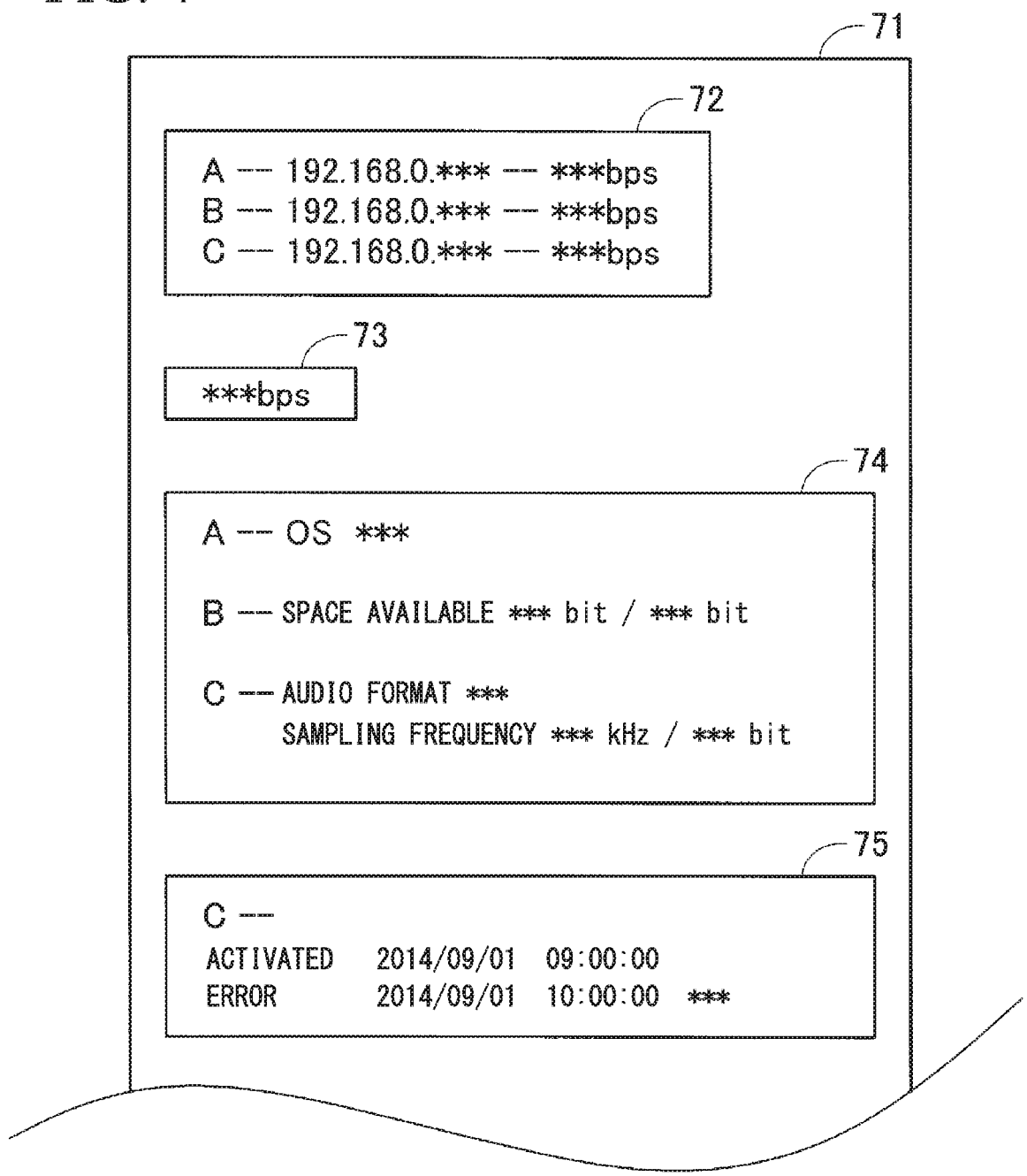
FIG. 4 is a diagram showing a configuration of device information according to an embodiment.

Next, the CPU 110 creates the device information 71 based on; the individual device information collected in step S3, the throughputs measured in step S5, and the bit rate calculated in step S7, and stores the device information 71 in the WAN-side storage unit 140 (step S9). As a result of the above, information acquisition processing is completed. As shown in FIG. 4, the device information 71 includes sections 72 to 75. The device information 71 is written in HTML (HyperText Transfer Protocol) for example. In the section 72, product (connected device) identifying information, an IP address, and a throughput is listed for each connected device. In the section 73, the bit rate of the data that can be played by the system 1 is listed. In the section 74, information regarding the installed function is listed for each connected device. In the section 75, log information (including error log information) of the connected devices is listed.

After completion of information acquisition processing, the operator can access the WAN-side storage unit 140 using the computer terminal 21A and acquire the device information 71 from the WAN-side storage unit 140. The operator can investigate the cause of the malfunction by viewing the device information 71.

For example, the operator can compare the bit rate listed in the section 73 with the sampling frequency of the audio data being played by the user, to determine whether or not a low throughput is the cause of the malfunction. The higher the sampling frequency, the larger the data quantity of the audio data tends to become. Consequently, for example, if the audio data being played by user has a high sampling frequency and the bit rate is low, it can be inferred that there is a high possibility that the malfunction was caused due to the throughput. The audio data having a high sampling frequency represents a so-called high resolution sound source for example. In a case where the LAN 100 is a wireless LAN, the throughput may change due to the communication environment, which includes interference with other wireless communication and obstruction of communication due to an obstacle. Consequently, when the measured throughput is low relative to the throughput of the system 1 expected by the user, the cause thereof can be easily identified by viewing the device information 71, which is useful for the operator when providing support. In addition, the operator can propose a method of improving the throughput based on the bit rate. Specifically, for example, the operator may suggest changing the installation method of the router 10, which functions as an access point. The operator may suggest changing the LAN 100 from a wireless LAN to a wired LAN. Furthermore, the operator may propose audio data having an optimal data amount when playing audio data using the system 1.

Next, the device information 71 will be further described. In the description above, a case where the playback audio is interrupted was described as an example. In addition, there is a case where a malfunction such as not being able to play audio data occurs. Specific examples of the cause of the malfunction include the connected device not being connected to the LAN 100, and the connected device not supporting the format of the audio data to be played. Therefore, in addition to the throughput and the bit rate described above, it is sufficient for the device information 71 to include information that can determine whether or not the connected device is connected to the LAN 100, and whether or not the connected device supports the format of the audio data to be played. For example, if one of the connected devices among the mobile terminal 30 (model name "A"), the NAS 40 (product category "B"), and the playback device 50 (model name "C") is not described in the section 72, it can be determined that the connected device not described in the section 72 thereof is not connected to the LAN 100. For example, if the log information of the mobile terminal 30 described in the section 75 lists a data transmission failure which has the NAS 40 as the transmission destination, the operator can determine that there is a malfunction in the communication between the mobile terminal 30 and the NAS 40. For example, when there is a change history in the settings in the log information of the playback device 50 listed in the section 75, the operator can determine that there is a possibility that the playback device 50 has been changed to a setting that does not receive data from other connected devices for security, and the like. The operator can understand the connection status between the connected devices and the LAN, and the operation status of the connected devices, based on the log information described in the section 74. Consequently, the operator can investigate the time period during which the malfunction occurred for example. The operator can determine whether or not the connected devices support the format of the audio data to be played, based on the installed function of the playback device 50 described in the section 74. Since the information related to the system 1 is aggregated in the device information 71, the operator can efficiently obtain information regarding the system 1 by referring to the device information 71. In addition to the operator, the user can also efficiently obtain information regarding the system 1 by referring to the device information 71 and omitting the trouble of acquiring the information included in the device information 71 from the connected devices individually for example.

Next, a modified example of information acquisition processing will be described.

In the description above, a case has been described where the steps S3 to S9 are sequentially executed such that they are triggered upon detection that the button 11 has been pressed. However, it is in no way limited to such a case. Alternatively, each step may be performed individually according to a set trigger.

For example, the processing of steps S3 and S5 may be executed such that they are triggered upon connection of a connected device to the router 10 via the LAN 100. In a case where the connected device is the mobile terminal 30, for example, the processing of steps S3 and S5 may be executed such that they are triggered upon activation of the application software in the mobile terminal 30 that controls the playback device 50. For example, the connected device may execute the processing of step S3 such that it is triggered upon the router 10 assigning an IP address to the connected device. This will be described in detail below. It is assumed that identification information indicating that the router 10 supports information acquisition processing is stored in the LAN-side storage unit 150 of the router 10. In response to an IP address being assigned by the router 10, the connected device accesses the LAN-side storage unit 150 and determines whether or not the identification information is stored. In response to determining that the identification information is stored in the router 10, the connected device determines that the router 10 supports information acquisition processing. Therefore, the connected device transmits the individual device information to the router 10. Upon receiving the individual device information transmitted from the connected device, the router 10 stores it in the RAM 130.

For example, the router 10 may execute the processing of steps S5 and S7 such that they are triggered upon an IP address being assigned to the connected device. For example, the router 10 executes the processing of steps S5 and S7 after assigning an IP address.

For example, the router 10 may execute the processing of step S9 such that it is triggered by a preset signal. The process of step S9 may be divided into processing that creates the device information 71 and processing that stores the device information 71 in the WAN-side storage unit 140, and may perform storage of the device information 71 in the WAN-side storage unit 140 such that it is triggered by a preset signal. The device information 71 may cause the RAM 130 or the LAN-side storage unit 150 to store the device information 71 before the device information 71 is stored in the WAN-side storage unit 150. The processing that creates the device information 71 may be executed after the processing of step S3 is executed. In this case, the device information 71 may be updated every time a connected device is connected to the LAN 100, or when the connection between a connected device and the LAN 100 is released. In this case, the processing of steps S5 and S7 may be executed every time a connected device is connected to the LAN 100. The device information 71 may be stored in any among the RAM 130, the WAN-side storage unit 140, and the LAN-side storage unit 150. Here, the preset signal is a signal corresponding to a user instruction. For example, it may be a signal that is transmitted in response to the user pressing a button provided on the router 10, or in response to operating application software that controls the router 10. In order to improve security, it is preferable that at least the processing that stores the device information 71 in the WAN-side storage unit 140 is executed in response to the user instruction.

Next, a modified example of step S5 will be described.

In the description above, a case where the CPU 110 provided in the router 10 measures the throughput of the data transfer between the router 10 and each connected device was described. However, it is in no way limited to such a case. The connected devices may measure the throughput of the data transfer between the router 10 and the connected device. The connected device may measure the throughput according to a command from the router 10. The connected device may measure the throughput such that it is triggered upon the connected device being connected to the router 10 via the LAN 100. The measured throughput is in no way limited to the throughput of the data transfer between the router 10 and the connected devices. The throughput of the data transfer between the connected devices may be measured.

The measured throughput is in no way limited to the throughput within the LAN 100. The throughput of the data transfer between a device connected to the WAN 200 and the connected device may be measured. The device connected to the WAN 200 may be a server connected to the Internet 20. This will be described in detail below. In the description above, a case where the system 1 plays audio data stored in the NAS 40 has been described. However, it is in no way limited to such a case. The system 1 may receive audio data from a content server connected to the Internet 20 by means of the router 10, and play the data thereof on the playback device 50. Here, the content server is a server that provides content that it retains, such as audio data, according to a request. In this case, the throughput can be calculated from the time required for the router 10 to receive the audio data from the content server, and the data size of the audio data. It is in no way limited to processing (streaming delivery) in which the system 1 plays the audio data while receiving it from the content server. The throughput may also be measured when the router 10 receives the audio data from the content server and stores it in the NAS 40 for example. Furthermore, the data provided from the content server is in no way limited to audio data, and may be data of another data format. In a case where the connected device receives data from a server before starting information acquisition processing, it may measure and store the throughput at the time of reception of the data from the server, and may include the throughput thereof in the individual device information.

In the embodiment described above, a system 1 including a mobile terminal 30, a NAS 40, a playback device 50, and a loudspeaker 60 has been described. However, the connected devices that configure the system 1 and the functions of the connected devices are in no way limited to this. For example, a controller storage and the loudspeaker may each be configured such that they can connect to the LAN 100, and then be connected to the LAN 100. In this configuration, audio data can be played by sound emission of digital audio data which is transmitted from a storage, from the loudspeaker for example. Furthermore, a controller, a storage, a player, an AV amplifier, a loudspeaker, and a display may be connected to the LAN 100. In this configuration, the following processing may be performed. That is to say, the storage or the player transmits digital audio/video data to the AV amplifier. The AV amplifier selects digital audio data from the received digital audio/video data and amplifies the selected digital audio data. The loudspeaker emits the amplified digital audio data thereof as sound. As a result of the processing described above, audio data can be played. Here, the controller is a device having the function of controlling the system. The controller is realized by, for example, a mobile terminal and a PC that can use application software that controls the system, or a remote controller attached to the device. The storage is a device that stores audio data or audio/video data that is played by the system. The storage is realized by, for example, a mobile terminal, a PC, a NAS, a HDD recorder, or the like. The player is a device having a processing function that reads data from a storage medium or a storage in which data to be played by the system is stored, and then converts it into a data format that can be handled at a later stage. The player is realized by, for example, a CD player, a DVD player, a network player, or the like. The AV amplifier is a device having a function that selects and amplifies audio data from audio/video data such as a movie.

The WAN-side storage unit 140 is an example of a storage unit. The system 1 is an example of an audio system. Furthermore, the information acquisition processing executed by the CPU 110 is an example of the processing executed by the acquisition unit. The process of step S5 executed by the CPU 110 is an example of the processing executed by the measurement unit. The process of step S7 executed by the CPU 110 is an example of the processing executed by the determination unit.

As described above, the following effects are obtained according to the foregoing embodiment.

(1) The device information 71 is written to the WAN-side storage unit 140, which is readable via the WAN 200. Consequently, a device connected to the WAN 200 can obtain the device information 71 related to the devices connected to the LAN 100. For example, the operator obtains the device information 71 by accessing the router 10 via the WAN 200 using the computer terminal 21A. The operator can analyze the state of the connected devices based on the obtained device information 71 and provide support to the user by using the analysis result. In this manner, the router 10 can provide information that is useful for resolving a problem, such as being unable to execute playback on the playback device 50, to the device connected to the WAN 200. The WAN-side storage unit 140 is readable via the WAN 200. Consequently, a device connected to the WAN 200 can acquire the device information 71 without accessing the interior of the LAN 100. The router 10 can provide the device information 71 without decreasing the security of the LAN 100. The device information 71, in which a plurality of pieces of individual device information is aggregated, is stored in the WAN-side storage unit 140 of the router 10. Therefore, it is possible to provide the state of the system 1 as one piece of information to the device connected to the WAN 200. The information that configures the device information 71 may be obtained in response to the router 10 requesting the individual device information from the connected devices, or the connected device itself may transmit it to the router 10 in response to a state change of the connected device, or the like.

(2) Furthermore, for example, the operator can access the router 10 via the WAN 200 using the computer terminal 21A, and obtain the device information 71 including communication log information in the connected devices. Consequently, the operator can provide support with respect to communications between the connected devices and the router 10 based on the device information 71. The communication log information in the connected devices may include log information of communications between the connected device and the router 10.

(3) Furthermore, for example, the operator can obtain the device information 71 including the throughputs by accessing the router 10 via the WAN 200 using the computer terminal 21A. Consequently, the operator can provide support with respect to communications between the connected devices and the router 10 based on the device information 71.

(4) Moreover, the device information 71 may include the throughputs measured in the processing of step S5.

(5) For example, when a plurality of connected devices are connected via the LAN 100 and the connected devices cooperatively play audio data, playing of the audio data depends on the communication speed between the connected devices having the smallest throughput, which restricts the playing of the audio data. Consequently, when audio data with a large data size is played, there is a case where a problem occurs such as playing being interrupted due to the throughput thereof being small. The operator can easily determine from the bit rate described in the device information 71 whether or not playing of audio data having a large data size can be executed. Furthermore, the operator can determine how to improve the connections of the connected devices in order to make it possible to play audio data of a desired bit rate. As a result of determining the bit rate of audio data that can be played by the system 1, it is possible to determine the data for performing optimal playback according to the throughputs of the data transfer.

The present invention is in no way limited to the embodiment described above, and various improvements and modifications can be made without departing from the spirit of the present invention.

For example, a case where the system 1 includes a mobile terminal 30, a NAS 40, and a playback device 50 was described. However, it is in no way limited to this. The embodiment described above can be applied to a system including an AV device, an audio device, a mobile terminal, a PC, an OA device, a household appliance, and the like, that support connection to a LAN. The embodiment described above can also be applied to a system in which only one device is connected to the LAN.

In the embodiment described above, a case where the device communicates via the wireless LAN has been described. However, it is in no way limited to this. It can also be applied to a case of communication via a wired LAN.

A case where the router 10 is configured by a CPU 110, a ROM 120, a RAM 130, and the like has been described. However, it is in no way limited to this. The router 10 may be realized by a circuit group such as an ASIC (Application Specific Integrated Circuit) or the like, or may be realized by a combination of a CPU and an ASIC.

A case where the router 10 executes information acquisition processing in response to detecting that the button 11 is pressed has been described. However, it is in no way limited to this. For example, the router 10 may receive an instruction from the user indicating execution of information acquisition processing via application software that controls the router 10.

The device information 71 is exemplified in FIG. 4. However, the configuration of the device information 71 is in no way limited to the example shown in the figure. The device information 71 may be another file format such as a text format displayed with only a single character for example. The device information 71 may have a configuration in which the connected devices are displayed with characters and shapes, such that they are indicated by icons and the like.

In the system 1, a case where the router 10 and the connected devices are directly connected to the LAN 100 has been described. However, it is in no way limited to such a case. A relay device such as a switching hub that mediates the communication between the router 10 and the connected devices may be provided, and the connected devices may be connected to the LAN 100 via the relay device thereof.

In the description above, a case where the router 10 has a DHCP server function has been described. However, it is in no way limited to this. For example, the system 1 may include a DHCP server. In this case, in step S3, the CPU 110 may extract the connected devices that have not transmitted the individual device information by querying the DHCP server. The setting required for network communication of the router 10 and the connected devices may be performed by a user or the like, and information related to the set network communication may be stored in the LAN-side storage unit 150.

A communication device according to an embodiment of the present invention includes: an acquisition unit that acquires first information via a first network from a first device connected to the first network, the first information being related to the first device; and a storage unit that stores device information comprising the acquired first information, the device information being readable from the storage unit via a second network by a second device connected to the second network, the second network being a network external to the first network. The device information including the first information related to the first device connected to the first network (for example, a LAN) is written in a storage unit that can be read from the second device connected to the second network (for example, a WAN). Consequently, the second device can obtain device information including information related to the first device connected to the first network via the second network. For example, the operator of the support center obtains the device information by accessing a communication device (for example, a router) via the second network using the second device (for example, a computer terminal). The operator analyzes the state of the first device based on the obtained device information, and provides support to the user using the analysis result. The first device is an AV device, an audio device, a mobile terminal, a PC (Personal Computer), a storage device, an OA device, a household appliance, and the like. The device information is information that identifies the device, such as a product name, a model name, or a model number, information related to a function installed to the first device, an IP address assigned to the first device, log information (including error log information) of the first device, and the like. The log information is, for example, an activation and shutdown history of the device, a change history of the settings related to the network and security, or a history of processing that resulted in error completions, such as data transmission and reception failures, and is information presented in a state that is associated with a date and time. In this manner, the communication device can provide the second device with useful information for solving problems such as being unable to play audio data on the first device for example. The storage unit can be read via the second network. Consequently, the second device can acquire information related to the first device without accessing the interior of the first network. The communication device can provide the device information to the second device without lowering the security of the first network. The device information, in which information on the devices connected to the first network is aggregated, is stored in the storage unit of the communication device. Therefore, it is possible to provide the state of the entire communication system composed of the devices connected to the first network, to the devices connected to the second network as one piece of information. The information constituting the device information may be acquired in response to the communication device requesting the device information (individual device information) from the device, and it may be transmitted by the device itself to the communication device in response to a state change of the device or the like.

The device information may include log information of communication between the first device and the communication device. The log information may include log information indicating a communication error between the first device and the communication device. For example, the operator of the support center can obtain the device information including the communication log information in the first device by accessing the communication device via the second network using the second device. Consequently, the operator can provide support with respect to communication between the first device and the communication device based on the device information.

The device information may include the throughput of data transfer performed by the first device. Here, the throughput may be a throughput related to data transfer between the communication device and the first device. The throughput may be a throughput related to data transfer between the first device and another device. The throughput may be a throughput related to data transfer between the first device and the side connected to the second network and the device. For example, the operator of the support center can obtain the device information including the throughput by accessing the communication device via the second network using the second terminal. Consequently, it is possible to provide support with respect to communication between the first device and the communication device based on the device information.

The communication device may include a measurement unit (for example, a CPU) that measures the throughput of data transfer performed by the first device. As a result, the throughput measured by the measurement unit can be added to the device information.

The communication device may further include a determination unit (for example, a CPU) that determines the bit rate of the audio data to be played based on the throughput. The device information may include the determined bit rate.

For example, when a plurality of devices are connected via the LAN and the devices cooperatively play audio data, playing of the audio data depends on the communication speed between the devices having the smallest throughput, which restricts the playing of the audio data. Consequently, when audio data with a large data size is played, there is a case where a problem occurs such as playing being interrupted due to the throughput thereof being small. The operator of the support center can easily determine from the bit rate described in the device information whether or not playing of audio data having a large data size can be executed. Furthermore, the operator can determine how to improve the connections of the devices in order to make it possible to play audio data of a desired bit rate. As a result of determining the bit rate of audio data that can be played by the audio system connected to the LAN, it is possible to determine the data for performing optimal playback according to the throughput of data transfer.

A program for realizing the functionality of the devices and system (for example, the router 10 and the system 1) according to the embodiment presented above may be recorded on a computer-readable recording medium, and processing may be performed by making a computer system read the program recorded on the recording medium, and then execute it.

The "computer system" referred to here may include an operating system (OS) and hardware such as a peripheral device.

The "computer-readable recording medium" includes a writable non-volatile memory such as a flexible disk, a magnetic optical disk, a ROM (Read Only Memory), and a flash memory, a portable medium such as a DVD (Digital Versatile Disk), and a recording device such as a hard disk that is built into the computer system.

The "computer-readable recording medium" also includes those that retain the program for a fixed time, such as a volatile memory (for example, DRAM (Dynamic Random Access Memory)) within the computer systems that become the server and the client in a case where the program is transmitted via a network such as the internet, or a communication line such as a telephone line.

The program described above may be transmitted from a computer system storing the program in a storage device, and the like, to another computer system via a transmission medium or by a transmission wave within the transmission medium. The "transmission medium" that transmits the program refers to a medium having a functionality that transmits information, such as a network (communication network) such as the Internet, or a communication line (communication wire) such as a telephone line.

The program described above may be one for realizing a portion of the functionality mentioned above.

The program described above may be one that realizes the functionality mentioned above by being combined with a program already stored in the computer system, as a so-called difference file (difference program).

The present invention may be applied to a communication device, a communication system, a communication method, and a program.

What is claimed is:

1. A communication device comprising:
a first processing circuit configured to acquire first information and second information via a first network from a first device connected to the first network, the first information being related to the first device; and
a storage that stores device information comprising the acquired first information and the second information, wherein
the first information is writable to the storage by the first device via the first network,
the first information is not readable from the storage by a second device via a second network,
the second information is writable to the storage by the first device via the first network, and
the second information is readable from the storage by the second device via the second network,
wherein after a predetermined time has elapsed, the first processing circuit extracts information associated with the first device that has not transmitted the first information after the first information was acquired and transmits a command in accordance with a first protocol which is different than a second protocol that is associated with the instruction to the first device requesting transmission of the first information.

2. The communication device according to claim 1, wherein the storage comprises a first storage that stores the first information, the first information being writable to the first storage by the first device via the first network.

3. The communication device according to claim 2, wherein the first information is not readable from the first storage by the second device via the second network.

4. The communication device according to claim 1, wherein the storage comprises:
a first storage that stores the first information and permits access by the first device via the first network; and
a second storage that stores the device information and permits access by the second device via the second network.

5. The communication device according to claim 1, wherein the device information comprises log information of a communication performed by the first device.

6. The communication device according to claim 5, wherein the log information comprises log information indicating an error in a communication performed by the first device.

7. The communication device according to claim 1, wherein the device information comprises a throughput of a data transfer performed by the first device.

8. The communication device according to claim 7, further comprising:
a second processing circuit configured to measure the throughput.

9. The communication device according to claim 7, further comprising:
a third processing circuit configured to determine a bit rate of audio data to be played based on the throughput, wherein the device information comprises the determined bit rate.

10. The communication device according to claim 1, wherein the first network is a local area network, and the second network is a wide area network.

11. The communication device according to claim 1, wherein
the first information is readable by the first device; and
device information other than the first information is readable by both the first device and the second device.

12. A communication system comprising:
a first device; and
a communication device, wherein
the first device is connected to a first network and transmits first information to the communication device via the first network, the first information being related to the first device, and
the communication device comprises:
a first processing circuit configured to acquire the transmitted first information and second information via the first network from the first device; and
a storage that stores device information comprising the acquired first information and the second information, wherein
the first information is writable to the storage by the first device via the first network,
the first information is not readable from the storage by the second device via the second network,
the second information is writable to the storage by the first device via the first network, and
the second information is readable from the storage by the second device via the second network,
wherein after a predetermined time has elapsed, the first processing circuit extracts information associated with the first device that has not transmitted the first information after the first information was acquired and transmits a command in accordance with a first protocol which is different than a second protocol that is associated with the instruction to the first device requesting transmission of the first information.

13. The communication system according to claim 12, further comprising:
the second device,
wherein the second device acquires the device information via the second network from the communication device.

14. A communication method comprising:
acquiring first information and second information via a first network from a first device connected to the first network, the first information being related to the first device;
providing a storage that stores device information comprising the acquired first information and the second information, wherein
the first information is writable to the storage by the first device via the first network,
the first information is not readable from the storage by a second device via the second network,
the second information is writable to the storage by the first device via the first network, and
the second information is readable from the storage by the second device via the second network; and
after a predetermined time has elapsed, extracting information associated with the first device that has not transmitted the first information after the first information was acquired and transmitting a command in accordance with a first protocol which is different than a second protocol that is associated with the instruction to the first device requesting transmission of the first information.

15. A non-transitory computer-readable storage medium storing a program that when executed causes a processor to:
acquire first information and second information via a first network from a first device connected to the first network, the first information being related to the first device;
store, using the storage, device information comprising the acquired first information and the second information, wherein
the first information is writable to the storage by the first device via the first network,
the first information is not readable from the storage by a second device via the second network,
the second information is writable to the storage by the first device via the first network, and
the second information is readable from the storage by the second device via the second network; and
after a predetermined time has elapsed, extract information associated with the first device that has not transmitted the first information after the first information was acquired and transmit a command in accordance with a first protocol which is different than a second protocol that is associated with the instruction to the first device requesting transmission of the first information.

* * * * *